United States Patent [19]

Jones

[11] Patent Number: 5,766,397

[45] Date of Patent: Jun. 16, 1998

[54] METHOD FOR AFFIXING FLOCK MATERIAL GRAPHICS TO VARIOUS SURFACES

[75] Inventor: Gregory V. Jones, Claremore, Okla.

[73] Assignee: LVV International, Inc., Claremore, Okla.

[21] Appl. No.: 757,587

[22] Filed: Nov. 27, 1996

[51] Int. Cl.⁶ .................................................. B44C 1/16
[52] U.S. Cl. ......................... 156/230; 156/289; 156/312
[58] Field of Search .................................. 156/230, 235, 156/239, 240, 311, 312, 62.9, 289; 428/31, 346, 347, 349, 354, 355 R, 200, 914; 427/208.2

[56] References Cited

U.S. PATENT DOCUMENTS

| | | |
|---|---|---|
| 2,096,750 | 10/1937 | Lawrence . |
| 2,494,848 | 1/1950 | Whitelegg . |
| 2,517,389 | 8/1950 | Dow et al. . |
| 2,681,877 | 6/1954 | Seymour . |
| 2,855,338 | 10/1958 | Mulkey . |
| 3,138,505 | 6/1964 | Hirsch . |
| 3,271,217 | 9/1966 | Mapson . |
| 3,793,112 | 2/1974 | Sontag et al. . |
| 3,822,144 | 7/1974 | Taylor . |
| 3,909,328 | 9/1975 | Dessauer et al. . |
| 3,956,552 | 5/1976 | Geary . |
| 3,975,558 | 8/1976 | Speer . |
| 3,985,598 | 10/1976 | Trenda et al. . |
| 4,034,134 | 7/1977 | Gregorian et al. ................. 156/230 X |
| 4,035,532 | 7/1977 | Gregorian et al. ................. 156/230 X |
| 4,037,008 | 7/1977 | Tugwell . |
| 4,061,516 | 12/1977 | George et al. . |
| 4,142,929 | 3/1979 | Otomine et al. . |
| 4,201,810 | 5/1980 | Higashiguchi . |
| 4,260,439 | 4/1981 | Speer . |
| 4,282,278 | 8/1981 | Higashiguchi ....................... 156/230 X |
| 4,292,100 | 9/1981 | Higashiguchi ....................... 156/239 X |
| 4,294,641 | 10/1981 | Reed et al. . |
| 4,314,813 | 2/1982 | Masaki .............................. 156/240 X |
| 4,340,632 | 7/1982 | Wells et al. ........................ 156/240 X |
| 4,342,614 | 8/1982 | Vanden Bergh . |
| 4,351,871 | 9/1982 | Lewis et al. . |
| 4,358,335 | 11/1982 | Reinert . |
| 4,396,662 | 8/1983 | Higashiguchi ....................... 156/240 X |
| 4,406,723 | 9/1983 | Marra et al. . |
| 4,597,812 | 7/1986 | Hamilton . |
| 4,659,525 | 4/1987 | Speer . |
| 4,715,914 | 12/1987 | Viner . |
| 4,741,791 | 5/1988 | Howard et al. . |
| 4,810,549 | 3/1989 | Abrams et al. . |
| 4,917,745 | 4/1990 | Speer . |
| 5,047,103 | 9/1991 | Abrams et al. . |
| 5,100,718 | 3/1992 | Weintraub . |
| 5,139,917 | 8/1992 | Hare . |
| 5,207,851 | 5/1993 | Abrams ............................... 156/230 |
| 5,441,785 | 8/1995 | Liebe, Jr. . |
| 5,470,609 | 11/1995 | Leach et al. . |
| 5,486,252 | 1/1996 | Wong . |
| 5,534,100 | 7/1996 | Mitchell . |

OTHER PUBLICATIONS

Excerpts from the deposition of George T. Scharr. pp. 3, 11–15, 17–24, 26–29, 44 and Exhibit 1, Sep. 13, 1996.
Excerpts from the deposition of Richard Brine, Jr., pp. 3–4, 30–45, 49–51, 75, 92=94, 111–116, Exhibit 6, Exhibit 7, Sep. 13, 1996.

*Primary Examiner*—Curtis Mayes
*Attorney, Agent, or Firm*—Head, Johnson & Kachigian

[57] ABSTRACT

A method of applying commercially available flock material to vehicular fabrics such as cloth, vinyl and leather by modifying said commercially available flock material to allow for use of lower temperatures in the thermal transfer adhesion process and applying said modified commercially available flock material graphic with a tool designed for controlling the temperature thereby obtaining the proper adhesion of the adhesive used in said thermal transfer process.

5 Claims, 2 Drawing Sheets

METHOD FOR AFFIXING FLOCK MATERIAL GRAPHICS TO VARIOUS SURFACES

BACKGROUND OF THE INVENTION

1. Technical Field

This invention describes a method for affixing flock material graphics to various surfaces including cloth, vinyl and leather. Such flock material graphics are currently in vogue for decorating the interiors of vehicular seats and interior side panels, but the method and apparatus is appropriate for such applications wherever desirable.

2. Background

Flock material graphics currently commercially available were developed for, and are still widely used in decorating clothes such as tee shirts and sweatshirts as well as other garments. The application of such flock material graphics to the garments is by a thermal transfer process.

Existing systems for applying flock material graphics are limited to certain surface materials due to the relatively high temperature required for adhesion. Such a process is described by Mitchell in U.S. Pat. No. 5,534,100 where a temperature of 350° F. to 380° F. is required. The use of such high temperatures poses a hazard to most of the usual upholstery material, from potential matting, charring, searing or other deformations such as the so-called halo effect, such that Mitchell requires the use of a heat shield during the heat application phase. Even with the heat shield, there is the possibility of deforming the receiving surface, particularly when the existing method is used by less experienced applicators, resulting in greater inefficiency and thus higher cost.

The present invention provides an effective method of applying flock material graphics without the need for such a relatively high temperature, thus obviating the need for use of a heat shield and resulting in lessened chances of damage to the cloth upholstery. The new method further enables the use of such applications to surfaces other than cloth, including more particularly vinyl and leather, thus expanding the use of such graphic decorations to virtually all presently used vehicular seat and side liner fabrics.

SUMMARY OF THE INVENTION

The present invention utilizes a digital thermal fusion unit (TFU) operatively connected to a hand held heating surface. The TFU is equipped with a temperature control device such as a thermocouple which allows the unit to maintain a desired temperature. To further protect the fabric on which the flock material graphic is to be affixed, the TFU is equipped with a governor to prevent the temperature of the heating surface from exceeding the safe temperature of about 285° F. to 295° F. The TFU has a temperature setting dial, which is set to the recommended application temperature, a temperature typically 240° F., and is also equipped with a readout which will read the actual temperature. In operation the unit will heat up to the desired temperature and once reached will maintain said temperature.

The standard flock material graphic as readily available commercially has a polyvinyl chloride (PVC) or polyester adhesive in its base layer (i.e. the layer that is immediately adjacent to the fabric to which the flock material graphic is attached). In the present invention the off-the-shelf flock material graphic is modified by the addition of a polyurethane adhesive laminate to the PVC or polyester adhesive laminate.

The method known to date of applying the commercially available flock material graphic was to utilize the PVC or polyester adhesive by placing said layer against the surface to which it is to be attached and applying heat. The temperature required to cause the adhesive to soften and penetrate the fabric and thus cause adhesion is on the order of 350° F. At such temperatures extreme care must be exercised to ensure that when the heat is applied the upholstery cloth on which the flock material graphic is applied is not matted or seared. Even when precautions are used there is a potential for excessive heat damage. Another difficulty is the so-called halo effect, particularly on fine nap cloth material, where the result of using high temperatures of 350° F.–380° F. is a lightening of the cloth caused by the fibers "matting down".

One approach, as discussed in the Mitchell patent, is to use a protective heat shield during the application process. Although such a procedure reduces the potential damage rate during application it does not overcome it. A better approach is to avoid the use of such relatively high temperatures, which temperatures have the inherent limitation of causing damage to the cloth. The use of lower and thus safer temperatures overcomes the potential for cloth damage, but in and of itself the lower temperatures would not suffice to melt the adhesive and would defeat the entire process.

The unique solution of this current invention is to modify the commercially available flock material graphic by adding to the PVC or polyester adhesive layer thereof an additional layer or laminate containing a lower temperature adhesive, more particularly a polyurethane adhesive. By affixing this additional layer to the flock material graphic there is no need to utilize high temperature when attaching the modified flock material graphic to the upholstery.

As a further step to avoid potential damage to upholstery during application, the heating unit is designed such that it is made of two parts. A hand held heating surface to be applied to the flock material graphic is operationally connected to a control unit. The control unit is equipped with means to cause the heating surface to reach and maintain certain specified temperatures within close tolerances. A readout on the control unit shows both the temperature setting selected and the temperature actually present on the heating pad. To minimize cost one display unit is all that is required if a switch is added enabling the operator to switch from display of the set temperature to the actual temperature or vice-versa. As a further precaution the unit is designed such that the maximum temperature that the unit can reach is below a safe high temperature on the order of 290° F.

A better understanding of the invention and its objects and advantages will become apparent to those skilled in this art from the following detailed description, taken in conjunction with the attached figures, wherein there is shown and described only the preferred embodiment of the invention, simply by way of illustration of the best mode contemplated for carrying out the invention. As will be realized, the invention is capable of modifications in various obvious respects, all without departing from the invention. Accordingly, the description should be regarded as illustrative in nature and not as restrictive.

DETAILED DESCRIPTION OF THE PREFERRED EMBODIMENT

Decorative flock material currently available in the marketplace was originally designed for application in the apparel industry to decorate tee shirts, sweatshirts and the like. There are two present sources for such materials—Gerber Scientific Products which uses a polyvinyl chloride (PVC) adhesive, and Stahl's which uses a polyester adhesive. These commercially available materials require temperatures from 325°0 F. to 375° F. to successfully transfer the design onto the fabric.

In automobiles and other vehicles the most common cloth upholstery or interior materials used are polyester pile, nylon weave and wool. Of these only wool can handle these relatively high temperatures. To overcome the potential hazards of high temperature application, such as matting with polyester pile fabrics, a heat transfer flock material that can be successfully applied to the full range of interior vehicular fabrics e.g. cloth, leather and vinyl is needed. Such a material should have adhesives whose temperatures are low enough to avoid the adverse results of the high temperatures presently required if commercially available flock material is used.

Such a result can be achieved by applying a polyurethane adhesive having a flow temperature of about 185° F. to the existing PVC or polyester adhesive system used by the manufacturer of the commercially available flock materials.

By using a commercial laminating machine, the commercially available flock material and a polyurethane dry film adhesive of either 3 or 5 mil thickness is passed through the laminating machine with the adhesive side of the flock material facing up as it passes over the bottom heat shoe and bottom pinch roller of the laminating machine. The polyurethane dry film adhesive is fed, adhesive side face down, from the top mandrel of the machine, over the top heat shoe and the top roller. The top heat shoe is heated to a temperature of approximately 260° F. and the bottom shoe to a temperature of approximately 300° F. When the desired temperature is reached the machine gears are activated such that the commercially available flock material and the dry film adhesive moves through the laminating machine at a rate of about two feet per minute. The above procedure will cause the dry film adhesive to be permanently laminated to the standard adhesive used by the commercially available flock material. The resulting modified flock material can be cut into graphic designs with a readily available computer plotter/cutter and thereafter the resultant flock material graphic may be applied to cloth, leather and vinyl fabrics at a temperature which will not adversely affect such fabrics and yet provide for permanent adhesion.

Figure 1:
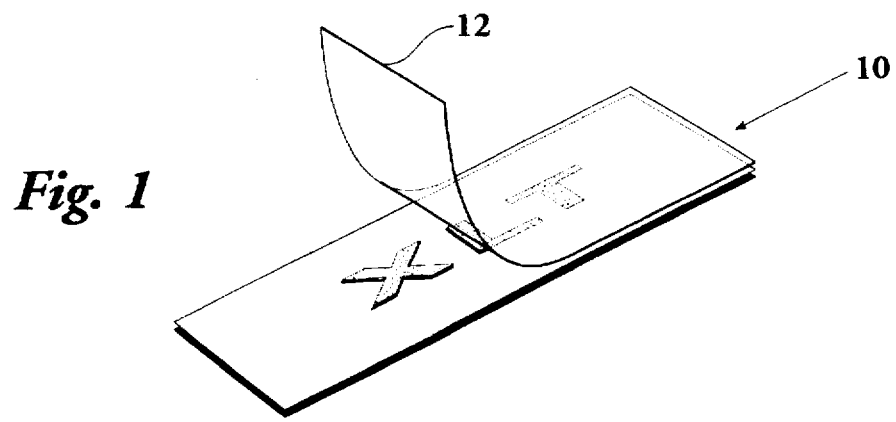
FIG. 1 shows the preferred flock material applique with the release liner being removed to expose the desired flock material graphic.
Figure 2:
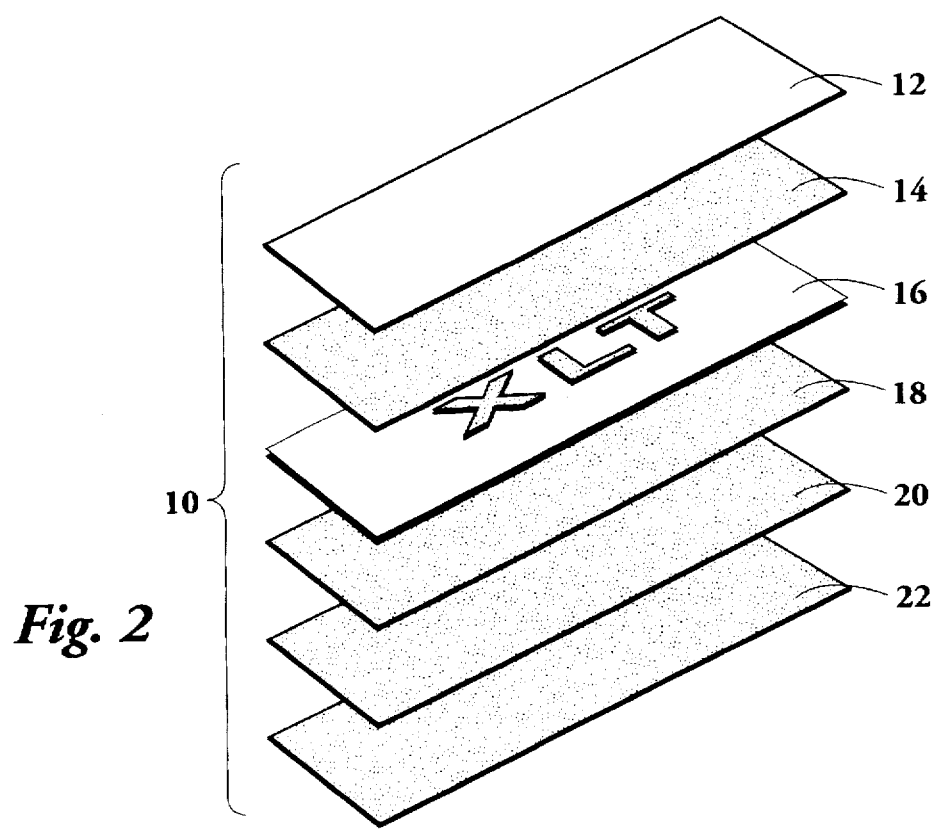
FIG. 2 shows an exploded view of the various layers or laminates of the flock material applique as modified.
Figure 3:
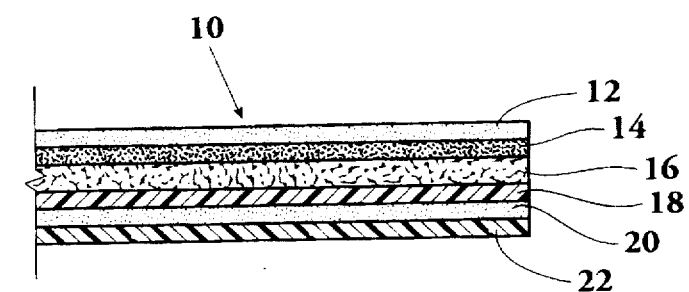
FIG. 3 shows a cross-sectional view of the flock material applique.

The modified flock material applique, generally indicated by the reference numeral 10, is shown in FIGS. 1-3. FIG. 2 shows an exploded view of the various layers, while FIG. 3 shows the product in cross-section.

From top to bottom the applique 10 is comprised of a release liner 12, a release adhesive 14, a layer of flock material 16, a film of fastening adhesive 18 for securing the flock material 16 and keeping it erect, a layer of PVC or polyester adhesive 20 and a layer of a low temperature polyurethane adhesive 22.

In practice, the applique is built starting with the film of fastening adhesive 18 to which is applied the layer of flock material 16. The release adhesive 14 is a tack or pressure-sensitive adhesive which is applied to the underside of the release liner 12. The release liner 12 with tack adhesive 14 is then pressed onto, and on top of, the flock material 16. The PVC adhesive layer 20 is then applied to the underside of the film of fastening adhesive 18. These steps are known in the art, and commercial products manufactured accordingly are available in rolls or sheets as mentioned above.

The low temperature polyurethane adhesive 22 is applied, as described above, to the PVC or polyester adhesive layer 20 of either of the two types of commercially available flock material.

A computer controlled cutting machine is utilized to plot and shape a particular graphic design, and to cut out such designs from the roll or sheet of modified flock material. FIGS. 1 and 2 show such a design with the letters XLT cut out.

Figure 4:
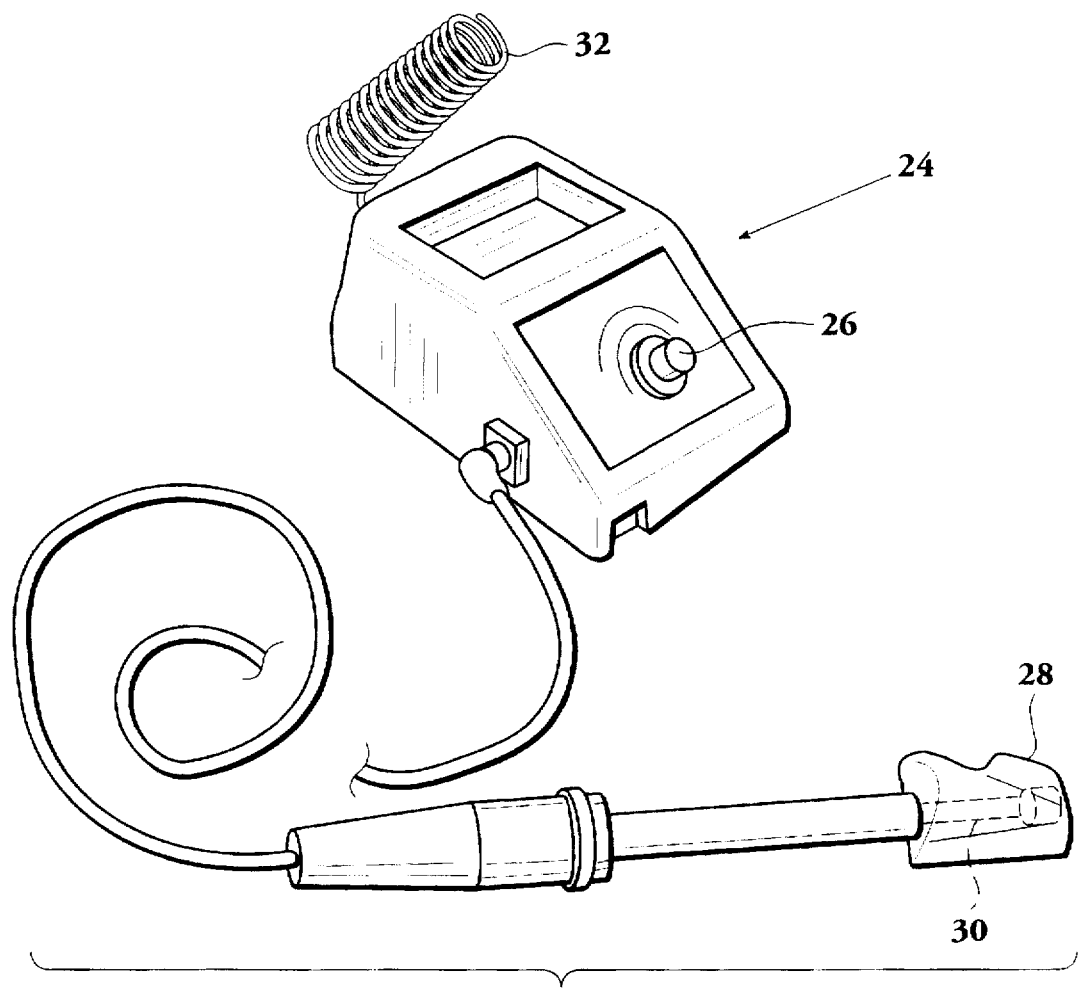
FIG. 4 shows a perspective view of the preferred instrument used to apply flock material graphics to various surfaces.

A graphic design is applied by selecting the space within the upholstery or inside fabrics of the vehicle and carefully aligning the design. The low temperature polyurethane adhesive laminate 22 is the side applied to the upholstery and the release liner 12 is the laminate on top. The graphic may be pinned to the upholstery to keep it in place during the thermal fusion process. The thermal fusion unit 24 as shown in FIG. 4 is set to the desired temperature by using the selector knob 26 and monitoring the readout on a display. When said temperature is reached, the heating element 28 is applied to the graphic flock material design with the flat side thereof. For cloth fabrics the optimum operation is 250° F., but a range of approximately 185° F.–285° F. is workable. A thermocouple 30 allows the unit to maintain the desired temperature. The heating element 28 should be applied directly on the release liner 12, using only light pressure, for about 45 to 60 seconds. Following the light pressure and heat, medium to heavy pressure should be applied across the release liner 12 for the last 10 to 15 seconds or for an additional 5 to 10 seconds. The heating element 28 should be returned to its holder 32 in the thermal fusion unit 24 while an aluminum chill bar (not shown) is applied for 10 to 15 seconds to the graphic release liner 12. The chill bar acts as a heat sink to draw heat away from the modified flock material and the surrounding surfaces. The release liner 12 is then carefully removed as shown in FIG. 1, to expose the finished surface of the graphic transfer. If after removing the release liner 12 there are yet loose edges remaining on any part of the graphic, additional pressure can be applied directly to the graphic by utilizing one of the heated surfaces of the heat tool head 28.

Figure 5:
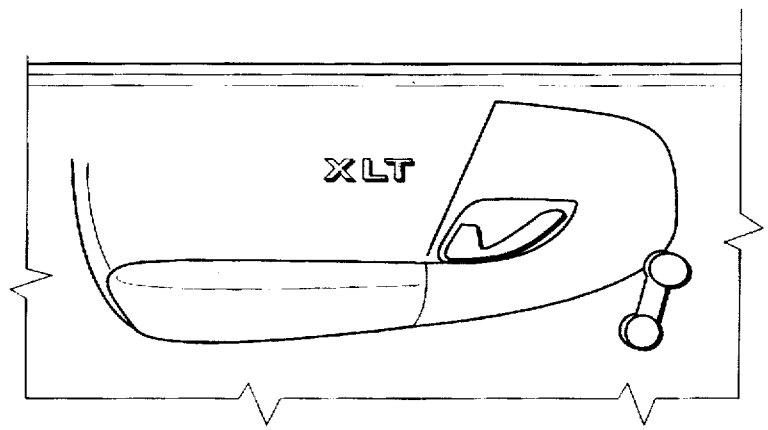
FIG. 5 shows a flock material graphic as applied to a vehicular door panel above the arm rest and handle.

FIG. 5 shows the finished product, a graphic of the letters XLT fixedly attached to the upholstery of a door side panel.

For applications to leather, the heating unit 24 should be set to 265° F.–275° F. The leather surface should be prepared by wiping the area where the graphic is to be located with a clean cloth dampened with isopropyl alcohol to remove any silicone contaminants. The next step is to lightly abrade the leather surface using a fine grit abrasive pad such as Scotch-Brite®. Following the abrading step, the area should again be wiped with a cloth dampened with isopropyl alcohol to remove any dust which may have been created by the abrasion process.

The selected graphic is then placed in its proper position on the leather surface and secured by using masking tape at the corners.

When the heat tool 28 has reached the proper temperature, it is applied directly onto the release liner of the graphic material, using only very light pressure. This light pressure is maintained for 45 to 60 seconds. The heating tool 28 should be moved over the entire area of the graphic maintaining light pressure for 45 to 60 seconds.

After heat application, the release liner 12 should be cooled with an aluminum chill bar for about 10 seconds. The release liner 12 is then carefully removed, exposing the finished side of the graphic.

For applications to vinyl, the heating unit 24 should be set to 210° F. The vinyl surface should be cleaned using a cloth dampened with isopropyl alcohol to remove any silicone contaminants. The selected graphic is positioned carefully at the desired location and secured to the surface by using masking tape applied to the corners of the release liner. A light cardboard template (not shown) should be prepared which surrounds the outer perimeter of the graphic release liner. The cardboard template assures that the heating tool 28 will not come in accidental contact directly with the vinyl surface. Being thus prepared, the heating tool 28 is applied to the graphic release liner 12, using light pressure for 30 seconds. The entire surface of the release liner 12 should be treated with the heat and pressure combination. Following the heating, the release liner 12 is cooled by using the aluminum chill bar for 10 seconds. Then the release liner 12 is carefully removed as shown in FIG. 1.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A low temperature method of applying a heat transfer flock material to an interior surface of a vehicle, including cloth, leather or vinyl, without damaging said interior surface, said flock material being a conventionally made material comprising a fibrous flock layer, a release liner, and a polyvinyl chloride or polyester adhesive layer having an adhesion temperature of about 375° F., said method comprising the steps of:

(a) overlaying said polyvinyl chloride or polyester adhesive layer with a supplemental adhesive layer having a flow temperature of about 185° F. to obtain a modified flock material;

(b) positioning said modified flock material upon said interior surface of said vehicle;

(c) applying heat and pressure to said modified flock material in a temperature range beginning about 185° F. up to but not to exceed 295° F. for 45 to 60 seconds with said pressure being at a greater force for the last 10 to 15 seconds.

(d) removing said release liner from said modified flock material.

2. The method according to claim 1, further comprising the step of cooling said modified flock material with an aluminum chill bar after said heat has been applied but prior to removing said release liner, said chill bar acting as a heat sink to draw heat away from said modified flock material and said interior surface.

3. The method according to claim 1, wherein said heat is applied by a hand-held iron.

4. The method according to claim 3, wherein said hand-held iron comprises a heating element electrically connected by an internal thermocouple to an adjustable power supply whereby a desired temperature is maintained.

5. A low temperature method of applying a heat transfer flock material to an interior surface of a vehicle, including cloth, leather or vinyl, without damaging said interior surface, said flock material being a conventionally made material comprising a fibrous flock layer, a release liner, and a polyvinyl chloride or polyester adhesive layer having an adhesion temperature of about 375° F., said method comprising the steps of:

(a) overlaying said polyvinyl chloride or polyester adhesive layer with a supplemental polyurethane adhesive layer having a flow temperature of about 185° F. to obtain a modified flock material;

(b) positioning said modified flock material upon said interior surface of said vehicle;

(c) applying heat and pressure to said modified flock material in a temperature range beginning about 185° F. up to but not exceeding 295° F. for 45 to 60 seconds said pressure being at a greater force for the last 10 to 15 seconds, said heat and pressure being applied by a hand-held iron, said hand-held iron comprising a heating element electrically connected to an internal thermo couple to an adjustable power supply whereby a desired temperature is maintained.

(d) cooling said modified flock material with an aluminum chill bar, said chill bar acting as a heat sink to draw heat away from said modified flock material and said interior surface; and (e) removing said release liner from said modified flock material.

* * * * *